US012530022B2

(12) United States Patent
Raman et al.

(10) Patent No.: US 12,530,022 B2
(45) Date of Patent: Jan. 20, 2026

(54) PROCESS CHAMBER QUALIFICATION FOR MAINTENANCE PROCESS ENDPOINT DETECTION

(71) Applicant: Applied Materials, Inc., Santa Clara, CA (US)

(72) Inventors: Arvind Shankar Raman, Austin, TX (US); Harikrishnan Rajagopal, Santa Clara, CA (US); Minal Balkrishna Shettigar, San Jose, CA (US); Vishwath Ram Amarnath, Chenna (IN); Yi Qi, Niskayuna, NY (US)

(73) Assignee: Applied Materials, Inc., Santa Clara, CA (US)

( * ) Notice: Subject to any disclaimer, the term of this patent is extended or adjusted under 35 U.S.C. 154(b) by 293 days.

(21) Appl. No.: 18/158,370

(22) Filed: Jan. 23, 2023

(65) Prior Publication Data

US 2024/0248466 A1 Jul. 25, 2024

(51) Int. Cl.
*G05B 23/02* (2006.01)

(52) U.S. Cl.
CPC ....... *G05B 23/024* (2013.01); *G05B 23/0283* (2013.01)

(58) Field of Classification Search
CPC .............. G05B 23/024; G05B 23/0283; G05B 23/0286
See application file for complete search history.

(56) References Cited

U.S. PATENT DOCUMENTS

| 6,656,848 B1 | 12/2003 | Scanlan et al. |
| 6,839,603 B2 | 1/2005 | Karasawa |
| 10,254,641 B2 | 4/2019 | Mailfert et al. |

(Continued)

FOREIGN PATENT DOCUMENTS

| JP | 2004319857 A | 11/2004 |
| JP | 2014507801 A | 3/2014 |

(Continued)

OTHER PUBLICATIONS

International Search Report and Written Opinion for International Application No. PCT/US2023/010347, mailed May 3, 2023, 10 Pages.

(Continued)

*Primary Examiner* — Mi'schita' Henson
(74) *Attorney, Agent, or Firm* — Lowenstein Sandler LLP

(57) ABSTRACT

Methods and systems for process chamber qualification for maintenance process endpoint detection are provided. Data collected by one or more sensors of a process chamber of a manufacturing system is identified. The identified data is collected during performance of initial maintenance operation(s) of a maintenance process. A current state of the process chamber is determined, based on the identified data, after the performance of the initial maintenance operation(s) based on the identified data. In response to a determination that the current state does not satisfy one or more chamber maintenance criteria, a set of subsequent maintenance operations to be performed to cause the current state of the process chamber to satisfy the criteria is identified. Performance of the set of subsequent maintenance operations is initiated at the process chamber.

20 Claims, 7 Drawing Sheets

(56) References Cited

U.S. PATENT DOCUMENTS

| | | |
|---|---|---|
| 10,705,514 B2 | 7/2020 | Banna |
| 10,825,188 B1 | 11/2020 | Tan et al. |
| 10,970,629 B1 | 4/2021 | Dirac et al. |
| 11,128,737 B1 | 9/2021 | Fox et al. |
| 11,921,824 B1 | 3/2024 | Hester et al. |
| 2004/0169516 A1 | 9/2004 | Kraz |
| 2007/0288409 A1 | 12/2007 | Mukherjee et al. |
| 2010/0042452 A1 | 2/2010 | Chen et al. |
| 2010/0084544 A1* | 4/2010 | Tallavarjula ...... H01J 37/32972 250/252.1 |
| 2010/0332013 A1 | 12/2010 | Choi et al. |
| 2010/0332201 A1 | 12/2010 | Albarede et al. |
| 2011/0190917 A1 | 8/2011 | Moyne |
| 2012/0179373 A1 | 7/2012 | Lee et al. |
| 2015/0198944 A1* | 7/2015 | Han .................. G05B 23/0283 700/121 |
| 2015/0287621 A1 | 10/2015 | Xiao et al. |
| 2016/0313651 A1 | 10/2016 | Middlebrooks et al. |
| 2017/0062227 A1 | 3/2017 | Ishikawa et al. |
| 2018/0040460 A1 | 2/2018 | Gottscho |
| 2019/0237354 A1 | 8/2019 | Liu et al. |
| 2019/0294980 A1 | 9/2019 | Laukien et al. |
| 2020/0034511 A1 | 1/2020 | Dutta et al. |
| 2020/0226742 A1* | 7/2020 | Sawlani ............ H01L 21/67288 |
| 2020/0243359 A1 | 7/2020 | Hao et al. |
| 2020/0324410 A1 | 10/2020 | Bergantz et al. |
| 2021/0035833 A1 | 2/2021 | Feng et al. |
| 2021/0097453 A1 | 4/2021 | Wang et al. |
| 2022/0005713 A1 | 1/2022 | Lu et al. |
| 2022/0051118 A1 | 2/2022 | Rooney et al. |
| 2022/0068685 A1 | 3/2022 | Kigawa et al. |
| 2022/0254492 A1 | 8/2022 | Armitage et al. |
| 2022/0285234 A1 | 9/2022 | Yokomizo et al. |
| 2022/0293557 A1 | 9/2022 | Hsu et al. |
| 2022/0351997 A1 | 11/2022 | Gwinn |
| 2022/0364955 A1 | 11/2022 | Fukui et al. |
| 2022/0402087 A1 | 12/2022 | Fukunaga et al. |
| 2023/0032481 A1 | 2/2023 | Huang et al. |
| 2023/0113095 A1* | 4/2023 | Dixit .................. G05B 23/0294 700/32 |
| 2023/0219561 A1 | 7/2023 | El-Shaer et al. |
| 2025/0068923 A1 | 2/2025 | Fukushi et al. |

FOREIGN PATENT DOCUMENTS

| | | | |
|---|---|---|---|
| JP | 2021039534 A | 3/2021 | |
| JP | 2021086572 A | 6/2021 | |
| JP | 2021093020 A | 6/2021 | |
| KR | 1020110129742 A | 12/2011 | |
| KR | 20190060547 A | 6/2019 | |
| TW | 202129225 A | 8/2021 | |
| WO | WO-2005054968 A1 * | 6/2005 | ......... G05B 19/4184 |
| WO | 2018204410 A1 | 11/2018 | |
| WO | 2022103720 A1 | 5/2022 | |

OTHER PUBLICATIONS

Agarwal, A. et al., "Seasoning of plasma etching reactors: Ion energy distributions to walls and real-time and run-to-run control strategies," Journal of Vacuum Science & Technology A, published Apr. 25, 2008, pp. 498-512, vol. 26, No. 3.

Amarbayasgalan, T. et al., "Unsupervised Anomaly Detection Approach for Time-Series in Multi-Domains Using Deep Reconstruction Error", https://doi.org/10.3390/sym12081251, Symmetry 12, No. 8: 1251, published Jul. 29, 2020, 22 pages.

Reiß, M. et al., "Nonasymptotic upper bounds for the reconstruction error of PCA", https://arxiv.org/abs/1609.03779, Cornell University, Mar. 29, 2019, 44 pages.

Deng, A. et al., "Graph Neural Network-Based Anomaly Detection in Multivariate Time Series", Proceedings of the AAAI Conference on Artificial Intelligence, https://doi.org/10.1609/aaai.v3515.16523, vol. 35 No. 5: AAAI-21 Technical Tracks 5, pp. 4027-4035.

Shiga, M. et al., "Seasoning Optimization by Using Optical Emission Spectroscopy," 2020 International Symposium on Semiconductor Manufacturing, Dec. 15-16, 2020, 3 pages.

Zhang, C. et al., "A Deep Neural Network for Unsupervised Anomaly Detection and Diagnosis in Multivariate Time Series Data", Proceedings of the AAAI Conference on Artificial Intelligence, https://doi.org/10.1609/aaai.v33i01.33011409 vol. 33 No. 01: AAAI-19, IAAI-19, EAAI-20, Jul. 17, 2019, pp. 1409-1416.

International Search Report and Written Opinion of International Application No. PCT/US2022/052176 mailed Mar. 27, 2023.

* cited by examiner

300

```
┌─────────────────────────────────────────────────────────────────────────────┐
│ Process one or more substrates at a process chamber according to a maintenance operation │
│                    of a maintenance process recipe 310                       │
└─────────────────────────────────────────────────────────────────────────────┘
                                      ↓
┌─────────────────────────────────────────────────────────────────────────────┐
│ Obtain metrology data associated with the one or more substrates after completion of the │
│              maintenance operation at the process chamber 312                │
└─────────────────────────────────────────────────────────────────────────────┘
                                      ↓
┌─────────────────────────────────────────────────────────────────────────────┐
│    Determine that one or more criteria are satisfied based on the obtained metrology data 314 │
└─────────────────────────────────────────────────────────────────────────────┘
                                      ↓
┌─────────────────────────────────────────────────────────────────────────────┐
│ Identify trace sensor data collected at the process chamber during the performance of the │
│                one or more operations at the process chamber 316             │
└─────────────────────────────────────────────────────────────────────────────┘
                                      ↓
┌─────────────────────────────────────────────────────────────────────────────┐
│        Provide the identified trace sensor data for training a machine learning model 318 │
└─────────────────────────────────────────────────────────────────────────────┘
```

FIG. 3

PROCESS CHAMBER QUALIFICATION FOR MAINTENANCE PROCESS ENDPOINT DETECTION

TECHNICAL FIELD

Embodiments of the present disclosure relate, in general, to manufacturing systems and more particularly to process chamber qualification for maintenance process endpoint detection.

BACKGROUND

Substrate processing can include a series of processes that are carried out in one or more process chambers of a manufacturing system. For example, a substrate can be processed according to a deposition process, an etch process, etc. Performing such processes can cause wear to components of the process chamber and/or to interior surfaces of the process chamber. In some instances, substrate processing may be temporarily paused at a process chamber for a time period so that maintenance processes (e.g., preventative maintenance processes, corrective maintenance processes, etc.) can be performed to correct and/or mitigate the wear or damage to the process chamber components and/or the interior of the process chamber. Once the maintenance process is completed and the process chamber is restored to a condition that is suitable for substrate processes, the process chamber can resume substrate processing.

SUMMARY

Some of the embodiments described cover a system and method for process chamber qualification for maintenance process endpoint detection. The method includes identifying data collected by one or more sensors of a process chamber of a manufacturing system. The identified data is collected during performance of one or more initial maintenance operations of a maintenance process associated with the process chamber. The method further includes determining a current state of the process chamber after the performance of the one or more initial maintenance operations based on the identified data. The method further includes, responsive to determining that the current state of the process chamber does not satisfy one or more chamber maintenance criteria, identifying a set of subsequent maintenance operations of the maintenance process, the set of subsequent maintenance operations to be performed to cause the current state of the process chamber to satisfy the one or more chamber maintenance criteria. The method further includes initiating performance of the set of subsequent maintenance operations at the process chamber.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 3 is a flow chart of a method for obtaining data for training a machine learning model, according to aspects of the present disclosure.

DETAILED DESCRIPTION OF EMBODIMENTS

Figure 1:
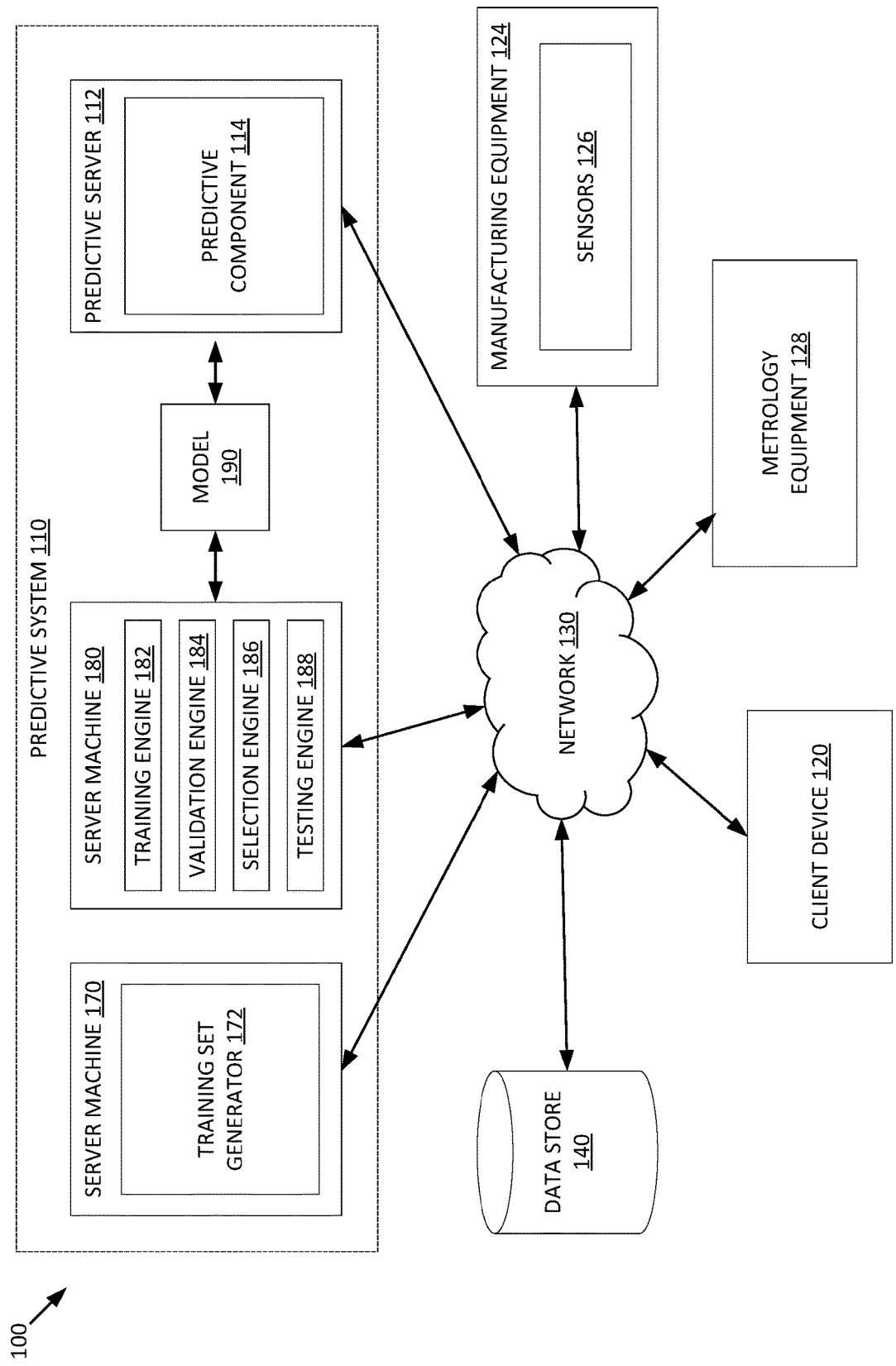
FIG. 1 depicts an illustrative computer system architecture, according to aspects of the present disclosure.

Implementations described herein provide systems and methods for process chamber qualification for maintenance process endpoint detection. Substrate processing can include a series of processes that produces electrical circuits in a semiconductor (e.g., a silicon wafer, etc.) in accordance with a circuit design. Such substrate processes can be carried out using substrates placed in one or more process chambers of a manufacturing system. A substrate process can include a deposition process, an etch process, and so forth. A deposition process involves depositing one or more layers of materials on a surface of a substrate placed within a process chamber. An etch process involves transferring a pattern of a mask material into one or more layers of material on the surface of the substrate. For example, after a substrate is placed in a process chamber, an etching plasma can be flowed into the process chamber and can remove (e.g., etch) away portions of the layers of material on the surface of the substrate that are not covered by the mask material. The portions of the layers that remain after the etching process can have the same or a similar pattern as the pattern of the mask material. Production substrates, as referred to herein, include any substrate that is processed according to a substrate process (e.g., an etch process, a deposition process, etc.).

As process chambers can process a significant amount of production substrates (e.g., hundreds, thousands, hundreds of thousands, etc.), maintenance processes can be periodically performed to correct and/or mitigate wear or damage to process chamber components and/or an interior of the process chambers. A maintenance process can be a preventative maintenance (PM) process and/or a corrective maintenance (CM) process. A PM process refers to a maintenance process that is performed according to a routine maintenance schedule to maintain one or more components of the process chamber and/or mitigate wear to an interior of the process chamber. A CM process refers to a maintenance process to correct or mitigate a failure of one or more process chamber components that is detected before, during, or after completion of a substrate process (e.g., between the performance of scheduled PM processes).

PM and/or CM processes can involve one or more operations to bring a process chamber to a condition that is suitable for production substrate processing. For some substrate processes, byproducts can be generated and/or deposited on process chamber components and/or an interior surface of the process chamber. For example, excess material that is not deposited on a surface of a substrate during a deposition process can be deposited on interior walls and/or surfaces of components of the process chamber. In another example, etch byproducts (e.g., silicon oxide, organic polymer, etc.) can be generated during an etch process and deposited onto interior surfaces and/or component surfaces within the process chamber. Byproducts left in a process chamber can affect the performance of subsequent processes performed at the chamber. Accordingly, one or more operations of the maintenance process can involve the removal of such byproducts left in the process chamber. In an illustrative example, a cleaning plasma can be introduced into the process chamber during a maintenance process. The cleaning plasma reacts with the byproducts in the chamber and the products of this reaction are removed from the chamber. After such chamber cleaning, the process chamber is unsuitable for immediate substrate processing. Accordingly, an operation is performed by etching a one or more substrates (e.g., blank silicon wafers or dummy wafers) to restore the interior of the process chamber to a condition that is suitable for substrate processes. Operations to remove byproducts from surfaces of a process chamber and/or etch substrates to restore the interior of the process chamber are referred to herein as chamber seasoning operations or seasoning operations. Substrates etched by a chamber seasoning operation are referred to herein as seasoning substrates.

In some systems, metrology is used to determine whether the interior of the process chamber is restored to a condition that is suitable for production substrate processing. For example, after a chamber seasoning operation is completed, the seasoning substrate is transferred from the process chamber to metrology equipment. In some instances, the metrology equipment is located externally to the process tool including the process chamber and the seasoning substrate accordingly is removed from a vacuum environment of the process tool during transfer to the metrology equipment. The metrology equipment performs obtains metrology measurement values for the seasoning substrate (e.g., critical dimension (CD) measurement values, etch rate measurement values, etc.), which can be used (e.g., by a system controller) to determine whether a chamber condition is met (e.g., whether the obtained metrology measurement values correspond to target metrology measurement values for the chamber). Subsequent seasoning operations can be performed at the processing chamber until the chamber condition is met and/or a threshold number of seasoning substrates are processed. Once the chamber condition is met and/or the threshold number of seasoning substrates are processed, the process chamber is determined to be restored to a condition that is suitable for substrate processes and the process chamber can be used for production substrate processing.

The amount of time between taking a process chamber offline to perform a maintenance process (e.g., a PM process, a CM process, etc.) and bringing the process chamber back online for production substrate processing is referred to as green-to-green (G2G) time. As the amount of G2G time for a process chamber increases, the overall number of production substrates processed by the process chamber decreases, which can reduce an overall efficiency and throughput, and increase an overall latency for the process chamber and for the manufacturing system. As indicated above, for each seasoning operation performed at a process chamber, seasoning substrates are removed from the process chamber and transferred to metrology equipment for measurement, which can be external from a process tool including the process chamber. Transferring seasoning substrates to the metrology equipment and obtaining metrology measurements for the seasoning substrates can take a significant amount of time, which can increase the G2G time for the process chamber. In some systems, as initial seasoning substrates are transferred from a process chamber and measured by external metrology equipment, additional seasoning operations may be performed for subsequent seasoning substrates at the process chamber. The process chamber may have been restored to a condition that is suitable for processing production substrates after the seasoning operations for the initial seasoning substrates and therefore the additional seasoning operations initiated while the initial seasoning substrates are transferred and measured may be unnecessary. The additional seasoning operations can therefore increase the G2G time for the process chamber and unnecessarily consume resources (e.g., processing resources, computing resources, etc.) for the manufacturing system, which can further reduce the efficiency and throughput and increase the overall latency for the manufacturing system.

Aspects of the present disclosure address the above noted and other deficiencies by providing systems and methods for process chamber qualification for maintenance process endpoint detection. In some embodiments, one or more initial maintenance operations are performed as part of a maintenance process (e.g., a PM process, a CM process, etc.) for a process chamber of a manufacturing system. The one or more initial maintenance operations can include a chamber seasoning operation performed for one or more seasoning substrates, in some embodiments. As the initial maintenance operations are performed, one or more sensors of the process chamber can collect data indicating a state of one or more components of the process chamber and/or an interior environment of the process chamber during the maintenance process. The sensors can include temperature sensors (e.g., to measure a temperature of a lid heater, heaters of a substrate support assembly, etc.), radio frequency (RF) source sensors (e.g., to measure an amount of RF power provided to an interior environment of the process chamber and/or one or more components of the process chamber), RF bias sensors, (e.g., to measure an amount of RF bias for one or more electrodes of the process chamber), and so forth. In some embodiments, the data collected by the sensors of the process chamber can be trace sensor data that is collected during at least a portion of the one or more initial maintenance operations performed at the process chamber.

A system controller can identify the data collected by the sensors of the process chamber and can determine a current state of the process chamber after the performance of the initial maintenance operation based on the identified data. The current state of the process chamber can represent a difference (or an error) between the trace sensor data collected during performance of the initial maintenance operations and target trace sensor data. Target trace sensor data can be data collected by sensors of one or more process chambers that are determined (e.g., based on metrology data collected for seasoning substrates processed at the process chambers) to have been restored to a condition that is suitable for production substrate processing. Such a process chamber is referred to herein as a reference chamber or a golden chamber. Trace sensor data collected during a maintenance process performed at the reference chamber is referred to herein as reference trace sensor data or golden trace sensor data.

In some embodiments, the system controller can determine the current state of the process chamber based on one or more outputs of a machine learning model. The machine learning model can be trained to predict the current state of a process chamber after performance of one or more maintenance operations (e.g., chamber seasoning operations) for one or more seasoning substrates based on given sensor data collected during the performance of the one or more maintenance operations at the process chamber. In some embodiments, the machine learning model can be a neural network (e.g., an autoencoder) that is trained using reference/golden trace sensor data collected for one or more process chambers that are determined to have been restored to a condition that is suitable for production substrate processing. Further details regarding determining the current state of the process chamber and using and training the machine learning model are provided herein.

In some embodiments, the system controller can determine whether subsequent maintenance operations are to be performed at the process chamber based on the determined current state of the process chamber. In an illustrative example, the initial maintenance operations can be performed at the process chamber using a first number of seasoning substrates. The system controller can determine whether the current state of the process chamber corresponds to a state of the reference chamber by determining whether the trace sensor data collected for the initial maintenance operations corresponds to trace sensor data collected for final maintenance operations performed to restore the reference chamber to a suitable condition (referred to as the final state of the reference chamber). If the current state of the process chamber corresponds to the final state of the reference chamber, the system controller can determine that subsequent maintenance operations are not to be performed at the process chamber and the process chamber can resume processing of production substrates.

If the current state of the process chamber does not correspond to the final state of the reference chamber, the system controller can determine whether the current state of the process chamber corresponds to a state of the reference chamber after the performance of maintenance operations using the first number of seasoning substrates. In response to determining that the current state of the process chamber corresponds to the state of the reference chamber, the system controller can determine a second number of seasoning substrates that are to be processed at the process chamber based on a difference between the first number of seasoning substrates and the total number of seasoning substrates processed at the reference process chamber. The system controller can determine a set of subsequent maintenance operations to be performed at the process chamber based on the determined second number of seasoning substrates, in accordance with embodiments described herein.

In response to determining that the current state of the process chamber does not correspond to the state of the reference chamber, the system controller can compare the trace data collected during performance of the initial maintenance operations and the trace data collected for the reference process chamber. If an anomaly is detected based on the comparison, the system controller can analyze the trace data to determine the source of the anomaly and, in some embodiments, can modify one or more settings of the process chamber during performance of subsequent maintenance operations to address the anomaly. Further details regarding determining whether subsequent maintenance operations are to be performed at the process chamber and detecting anomalies in trace data are provided herein. The system controller can initiate performance of the subsequent maintenance operations and/or modify the one or more settings of the process chamber, as indicated above. The system controller can determine that the process chamber is restored to a suitable condition for processing production substrates after the subsequent maintenance operations are performed.

Aspects of the present disclosure address deficiencies of the conventional technology by providing systems and methods for determining an endpoint of a maintenance process based on sensor data collected during the maintenance process. As indicated above and described in further detail herein, a system controller can determine a current state of a process chamber based on trace sensor data collected during performance of maintenance operations at the process chamber. The system controller can compare the current state of the process chamber to data indicating a state of a reference process chamber during one or more time periods of a maintenance process to determine whether subsequent maintenance operations are to be performed and, if so, a number of subsequent maintenance operations to be performed and/or one or more modified process chamber settings. Embodiments of the present disclosure enable a system controller to determine an endpoint of a maintenance process without relying on metrology. Accordingly, seasoning substrates are not removed from the process tool and transferred to external metrology equipment for measurement and additional maintenance operations are not performed during the transfer and measurement to the external metrology equipment. The length of a maintenance process at a process chamber can therefore be determined without the performance of unnecessary maintenance operations. The G2G time for the process chamber is therefore shortened, allowing for a larger number of production substrates to be processed at the process chamber which improves an overall efficiency and throughput and reduces an overall latency of the process chamber and the manufacturing system.

FIG. 1 depicts an illustrative computer system architecture 100, according to aspects of the present disclosure. Computer system architecture 100 can include a client device 120, manufacturing equipment 124, metrology equipment 128, a predictive server 112 (e.g., to generate predictive data, to provide model adaptation, to use a knowledge base, etc.), and/or a data store 140. The predictive server 112 can be part of a predictive system 110. The predictive system 110 can further include server machines 170 and 180. In some embodiments, computer system architecture 100 can be included as part of a manufacturing system for processing substrates, such as manufacturing system 200 of FIG. 2.

Manufacturing equipment 124 can produce products, such as electronic devices, following a recipe or performing runs over a period of time. Manufacturing equipment 124 can include a process chamber, such as process chamber 214 described with respect to FIG. 2. Manufacturing equipment 124 can perform a process for a substrate (e.g., a wafer, etc.) at the process chamber. Examples of substrate processes include a deposition process to deposit a film on a surface of the substrate, an etch process to form a pattern on the surface of the substrate, etc. Manufacturing equipment 124 can perform each process according to a process recipe. A process recipe defines a particular set of operations to be performed for the substrate during the process and can include one or more settings associated with each operation. For example, a deposition process recipe can include a temperature setting for the process chamber, a pressure setting for the process chamber, a flow rate setting for a precursor for a material included in the film deposited on the substrate surface, etc. Substrates that are processed according to a process recipe (e.g., for manufacturing a portion of an electronic device, etc.) are referred to herein as production substrates.

Maintenance processes can be performed at a process chamber to correct and/or mitigate wear or damage to process chamber components and/or the interior of the process chambers. As indicated above, a maintenance process can include a preventative maintenance (PM) process (e.g., a maintenance process performed according to a routine maintenance schedule) and/or a corrective maintenance (CM) process (e.g., a maintenance process to correct or mitigate a failure of one or more process chamber components that is detected before, during, or after completion of a substrate process). It should be noted that although some embodiments of the present disclosure refer to a PM process, such embodiments can be applied to a CM process, and vice versa. It should also be noted that embodiments of the present disclosure can be applied to any type of process (e.g., maintenance process and/or non-maintenance process) and any type of operation of a process.

In some embodiments, a maintenance process can include one or more seasoning operations. Seasoning operations can involve removing byproducts from surfaces of one or more process chamber components and/or an interior surface of the process chamber and, after the removal, bringing the process chamber to a state that is suitable for processing production substrates. In an illustrative example, one or more seasoning operations can involve introducing a cleaning plasma into a process chamber, where the cleaning plasma reacts with byproducts in the chamber. The reactants are removed from the process chamber (e.g., via a gas flow, etc.). After the reactants are removed, the process chamber is unsuitable for immediate substrate processing. Seasoning substrates (e.g., blank silicon wafers, dummy wafers, etc.) can be etched at the process chamber. The etch process may be performed using the same or similar settings or conditions as an etch process that is to be performed for a production substrate (e.g., after the maintenance process is completed). The etch process can be performed for one or more seasoning substrates until it is determined (e.g., by a system controller for manufacturing equipment 124) that the process chamber is in a state or condition that is suitable for processing production substrates, in accordance with embodiments described herein.

Manufacturing equipment 124 can include one or more sensors 126 configured to capture data for a substrate being processed at the manufacturing system. In some embodiments, the manufacturing equipment 124 and sensors 126 can be part of a sensor system that includes a sensor server (e.g., field service server (FSS) at a manufacturing facility) and sensor identifier reader (e.g., front opening unified pod (FOUP) radio frequency identification (RFID) reader for sensor system). Sensor data may include a value of one or more of temperature (e.g., heater temperature), spacing (SP), pressure, high frequency radio frequency (HFRF), RF bias, voltage of electrostatic chuck (ESC), electrical current, flow, power, voltage, etc. Sensor data may be associated with or indicative of manufacturing parameters such as hardware parameters, such as settings or components (e.g., size, type, etc.) of the manufacturing equipment 124, or process parameters of the manufacturing equipment 124. The sensor data can be provided while the manufacturing equipment 124 is performing manufacturing processes (e.g., equipment readings when processing products). The sensor data 142 can be different for each substrate. In some embodiments, sensor data can include trace data collected during performance of one or more processes (e.g., substrate processes, maintenance processes, etc.) at manufacturing equipment 124. Trace data refers to data that indicates how components in a process chamber are operating and/or a state of an environment within a process chamber before, during, or after performance of an operation. Further details regarding sensor data are provided herein.

Metrology equipment 128 provides metrology data associated with substrates (e.g., production substrates, seasoning substrates, etc.) processed by manufacturing equipment 124. The metrology data can include a value of one or more of film property data (e.g., wafer spatial film properties), dimensions (e.g., thickness, height, etc.), dielectric constant, dopant concentration, density, defects, etc. In some embodiments, the metrology data can further include a value of one or more surface profile property data (e.g., an etch rate, an etch rate uniformity, a critical dimension of one or more features included on a surface of the substrate, a critical dimension uniformity across the surface of the substrate, an edge placement error, etc.). The metrology data can be of a finished or semi-finished product. The metrology data can be different for each substrate. Metrology equipment 128 can be configured to generate metrology data associated with a substrate before or after a substrate process and/or a maintenance process. In some embodiments, metrology equipment 128 can be part of a metrology system that includes a metrology server (e.g., a metrology database, metrology folders, etc.) and metrology identifier reader (e.g., FOUP RFID reader for metrology system).

Metrology equipment 128 can be integrated with a station of the process tool of manufacturing equipment 124. In some embodiments, metrology equipment 128 can be coupled to or be a part of a station of the process tool that is maintained under a vacuum environment (e.g., a process chamber, a transfer chamber, etc.). Such metrology equipment 128 is referred to as integrated metrology equipment. Accordingly, the substrate can be measured by the integrated metrology equipment while the substrate is in the vacuum environment. For example, after a process (e.g., an etch process, a deposition process, etc.) is performed for the substrate, the metrology data for the substrate can be generated by the integrated metrology equipment without the processed substrate being removed from the vacuum environment. In other or similar embodiments, metrology equipment 128 can be coupled to or be a part of the process tool station that is not maintained under a vacuum environment (e.g., a factory interface module, etc.). Such metrology equipment is referred to as inline metrology equipment. Accordingly, the substrate is measured by the inline metrology equipment outside of the vacuum environment.

In additional or alternative embodiments, metrology equipment 128 can include metrology measurement devices that are separate (i.e., external) from manufacturing equipment 124. For example, metrology equipment 128 can be standalone equipment that is not coupled to any station of manufacturing equipment 124. For a measurement to be obtained for a substrate using external metrology equipment, a user of a manufacturing system (e.g., an engineer, an operator) can cause a substrate processed at manufacturing equipment 124 to be removed from manufacturing equipment 124 and transferred to metrology equipment 128 for measurement. In some embodiments, metrology equipment 128 can transfer metrology data generated for the substrate to the client device 120 coupled to metrology equipment 128 via network 130 (e.g., for presentation to a manufacturing user, such as an operator or an engineer). In other or similar embodiments, the manufacturing system user can obtain metrology data for the substrate from metrology equipment 128 and can provide the metrology data to computer system architecture via a graphical user interface (GUI) of client device 120.

The client device 120 may include a computing device such as personal computers (PCs), laptops, mobile phones, smart phones, tablet computers, netbook computers, network connected televisions ("smart TVs"), network-connected media players (e.g., Blu-ray player), a set-top box, over-the-top (OTT) streaming devices, operator boxes, etc. In some embodiments, the metrology data may be received from the client device 120. In some embodiments, client device 120 displays a graphical user interface (GUI), where the GUI enables the user to provide, as input, metrology measurement values for substrates processed at the manufacturing system. In other or similar embodiments, client device 120 can display another GUI that enables user to provide, as input, an indication of a type of substrate to be processed at the manufacturing system, a type of process to be performed for the substrate, and/or a type of equipment at the manufacturing system. In yet other or similar embodiments, client device 120 can display another GUI that that presents sensor data collected by sensors 126 before, during, or after performance of a process (e.g., a substrate process, a maintenance process, etc.). It should be noted that one or more GUIs of client device 120 can provide and/or receive any data described herein.

Data store 140 can be a memory (e.g., random access memory), a drive (e.g., a hard drive, a flash drive), a database system, or another type of component or device capable of storing data. Data store 140 can include multiple storage components (e.g., multiple drives or multiple databases) that can span multiple computing devices (e.g., multiple server computers). The data store 140 can store data associated with processing a substrate at manufacturing equipment 124. For example, data store 140 can store data collected by sensors 126 at manufacturing equipment 124 before, during, or after a substrate process (referred to as process data). Process data can refer to historical process data (e.g., process data generated for a previous substrate processed at the manufacturing system) and/or current process data (e.g., process data generated for a current substrate processed at the manufacturing system). Current process data can be data for which predictive data is generated. In some embodiments, data store can store metrology data including historical metrology data (e.g., metrology measurement values for a prior substrate processed at the manufacturing system). The data store 140 can also store contextual data associated with one or more substrates processed at the manufacturing system. Contextual data can include a recipe name, recipe operation number, preventive maintenance indicator, operator, etc. In some embodiments, contextual data can also include an indication of a difference between two or more process recipes or process operations.

In some embodiments, data store 140 can be configured to store data that is not accessible to a user of the manufacturing system. For example, process data, spectral data, non-spectral data, and/or positional data obtained for a substrate being processed at the manufacturing system may not be accessible to a user of the manufacturing system. In some embodiments, all data stored at data store 140 is inaccessible by a user (e.g., an operator) of the manufacturing system. In other or similar embodiments, a portion of data stored at data store 140 is inaccessible by the user while another portion of data stored at data store 140 is accessible by the user. In some embodiments, one or more portions of data stored at data store 140 are encrypted using an encryption mechanism that is unknown to the user (e.g., data is encrypted using a private encryption key). In other or similar embodiments, data store 140 includes multiple data stores where data that is inaccessible to the user is stored in one or more first data stores and data that is accessible to the user is stored in one or more second data stores.

In some embodiments, predictive system 110 includes server machine 170 and server machine 180. Server machine 170 includes a training set generator 172 that is capable of generating training data sets (e.g., a set of data inputs and a set of target outputs) to train, validate, and/or test a machine learning model 190. Some operations of data set generator 172 are described in detail below with respect to FIGS. 3 and 4. In some embodiments, the data set generator 172 can partition the training data into a training set, a validating set, and a testing set. In some embodiments, the predictive system 110 generates multiple sets of training data.

Server machine 180 can include a training engine 182, a validation engine 184, a selection engine 185, and/or a testing engine 186. An engine can refer to hardware (e.g., circuitry, dedicated logic, programmable logic, microcode, processing device, etc.), software (such as instructions run on a processing device, a general-purpose computer system, or a dedicated machine), firmware, microcode, or a combination thereof. Training engine 182 can be capable of training a machine learning model 190. The machine learning model 190 can refer to the model artifact that is created by the training engine 182 using the training data that includes training inputs and corresponding target outputs (correct answers for respective training inputs). The training engine 182 can find patterns in the training data that map the training input to the target output (the answer to be predicted), and provide the machine learning model 190 that captures these patterns. The machine learning model 190 can use one or more of support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), etc.

The validation engine 184 can be capable of validating a trained machine learning model 190 using a corresponding set of features of a validation set from training set generator 172. The validation engine 184 can determine an accuracy of each of the trained machine learning models 190 based on the corresponding sets of features of the validation set. The validation engine 184 can discard a trained machine learning model 190 that has an accuracy that does not meet a threshold accuracy. In some embodiments, the selection engine 185 can be capable of selecting a trained machine learning model 190 that has an accuracy that meets a threshold accuracy. In some embodiments, the selection engine 185 can be capable of selecting the trained machine learning model 190 that has the highest accuracy of the trained machine learning models 190.

The testing engine 186 can be capable of testing a trained machine learning model 190 using a corresponding set of features of a testing set from data set generator 172. For example, a first trained machine learning model 190 that was trained using a first set of features of the training set can be tested using the first set of features of the testing set. The testing engine 186 can determine a trained machine learning model 190 that has the highest accuracy of all of the trained machine learning models based on the testing sets.

Predictive server 112 includes a predictive component 114 that is capable of determining a current state associated with a process chamber based on sensor data collected during one or more operations a maintenance process (e.g., seasoning operations of a PM or CM process). As described in detail below with respect to FIG. 5, in some embodiments, predictive component 114 can provide sensor data collected by one or more sensors of a process chamber during performance of one or more initial maintenance operations (e.g., seasoning operations) as input to model 190. The sensor data can include trace sensor data that is collected during at least a portion of the performance of the initial maintenance operation(s). Model 190 can be trained to predict, based on given data, a current state of the process chamber after the performance of at least one initial maintenance operation. The current state of the process chamber represents a difference (or an error) between sensor data collected during performance of the initial maintenance operations and target trace sensor data. Target sensor data refers to or includes data collected by process chambers that are determined (e.g., based on metrology data collected for seasoning substrates processed at the process chambers) to have been restored to a condition that is suitable for production substrates processing (e.g., a reference chamber).

Predictive component 114 can obtain one or more outputs of model 190 and determine the current state of the process chamber after performance of the initial maintenance operation(s) based on the one or more outputs. In some embodiments, the current state can be represented as a maintenance fingerprint score that indicates a distance between the trace sensor data collected during the initial maintenance operation(s) and target trace sensor data collected during one or more final maintenance operations performed to restore the reference chamber to a suitable condition (e.g., the final state of the reference chamber). Predictive component 114 and/or a system controller for manufacturing equipment 124 can determine whether the current state satisfies one or more chamber maintenance criteria. If so, the system controller can determine that the maintenance process at the process chamber is complete and can initiate performance of one or more production substrates at the process chamber. If the chamber maintenance criteria are not satisfied, predictive component 114 and/or the system controller can determine a set of subsequent maintenance operations to be performed at the process chamber and the system controller can initiate performance of the set of subsequent maintenance operations at the process chamber. Predictive component 114 can feed trace sensor data as an input to model 190 during and/or after performance of the set of subsequent maintenance operations and can determine, based on output(s) of the model 190, whether additional subsequent maintenance operations are to be performed. Such operations can be performed by predictive component 114 and/or the system controller until it is determined that the current state of the process chamber satisfies the chamber maintenance criteria. Further details regarding training model 190, determining a current state of a process chamber based on outputs of model 190 and identifying a set of subsequent maintenance operations to be performed at the process chamber are provided herein.

In some embodiments, predictive server 112 (or manufacturing equipment 124 or testing equipment 122) can transmit an indication of the assigned quality rating to client device 120. Client device 120 can provide the indication of the assigned quality rating to a user of the manufacturing system and/or testing system (e.g., an operator) via the GUI of client device 120.

The client device 120, manufacturing equipment 124, metrology equipment 128, predictive server 112, data store 140, server machine 170, and server machine 180 can be coupled to each other via a network 130. In some embodiments, network 130 is a public network that provides client device 120 with access to predictive server 112, data store 140, and other publically available computing devices. In some embodiments, network 130 is a private network that provides client device 120 access to manufacturing equipment 124, metrology equipment 128, data store 140, and other privately available computing devices. Network 130 can include one or more wide area networks (WANs), local area networks (LANs), wired networks (e.g., Ethernet network), wireless networks (e.g., an 802.11 network or a Wi-Fi network), cellular networks (e.g., a Long-Term Evolution (LTE) network), routers, hubs, switches, server computers, cloud computing networks, and/or a combination thereof.

It should be noted that in some other implementations, the functions of server machines 170 and 180, as well as predictive server 112, can be provided by a fewer number of machines. For example, in some embodiments, server machines 170 and 180 can be integrated into a single machine, while in some other or similar embodiments, server machines 170 and 180, as well as predictive server 112, can be integrated into a single machine.

In general, functions described in one implementation as being performed by server machine 170, server machine 180, and/or predictive server 112 can also be performed on client device 120. In addition, the functionality attributed to a particular component can be performed by different or multiple components operating together.

In embodiments, a "user" can be represented as a single individual. However, other embodiments of the disclosure encompass a "user" being an entity controlled by a plurality of users and/or an automated source. For example, a set of individual users federated as a group of administrators can be considered a "user."

Figure 2:
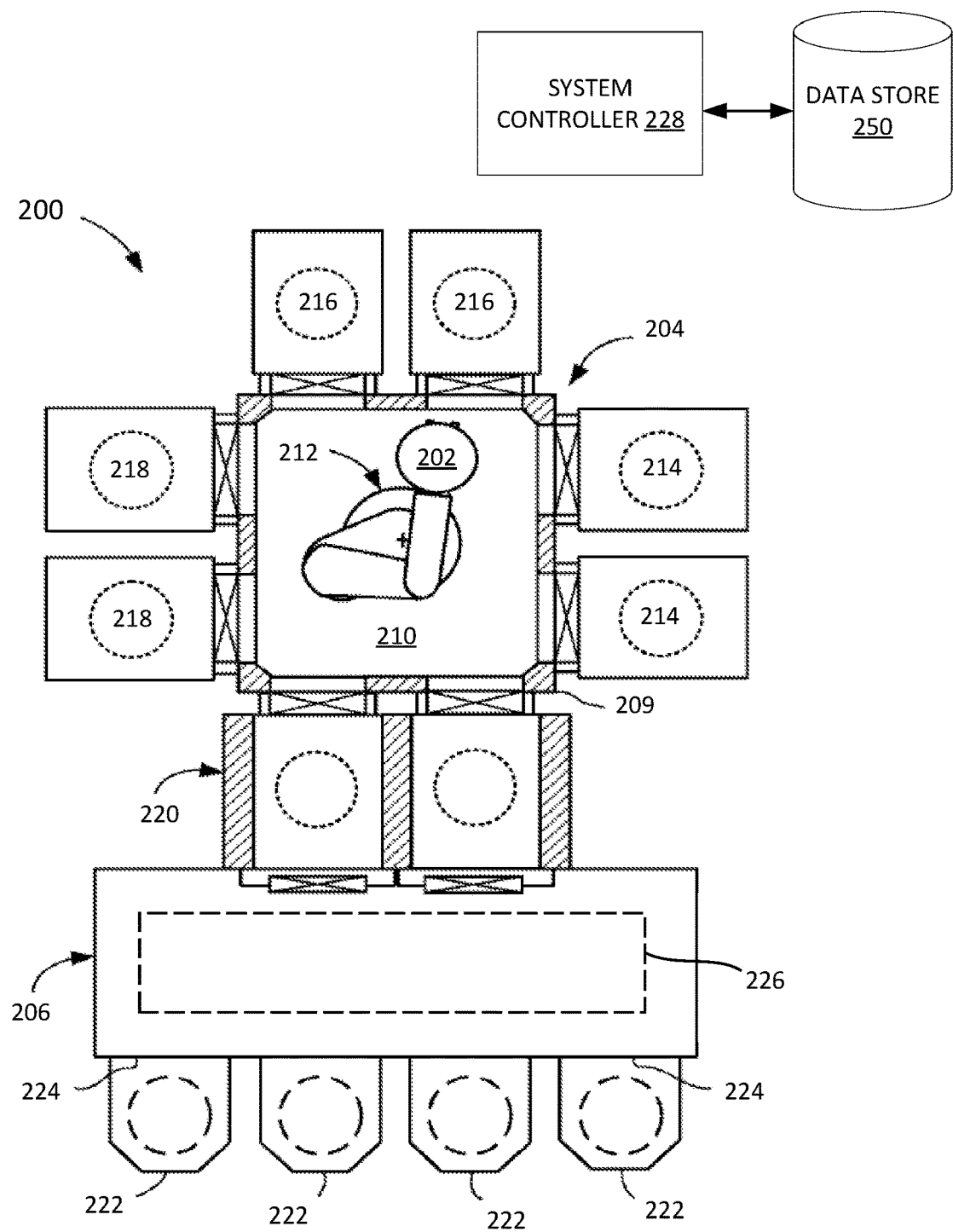
FIG. 2 is a top schematic view of an example manufacturing system, according to aspects of the present disclosure.

FIG. 2 is a top schematic view of an example manufacturing system 200, according to aspects of the present disclosure. Manufacturing system 200 can perform one or more processes on a substrate 202. Substrate 202 can be any suitably rigid, fixed-dimension, planar article, such as, e.g., a silicon-containing disc or wafer, a patterned wafer, a glass plate, or the like, suitable for fabricating electronic devices or circuit components thereon. Substrate 202 can include a production substrate and/or a seasoning substrate, in accordance with embodiments described herein.

Manufacturing system 200 can include a process tool 204 and a factory interface 206 coupled to process tool 204. Process tool 204 can include a housing 208 having a transfer chamber 210 therein. Transfer chamber 210 can include one or more process chambers (also referred to as processing chambers) 214, 216, 218 disposed therearound and coupled thereto. Process chambers 214, 216, 18 can be coupled to transfer chamber 210 through respective ports. Transfer chamber 210 can also include a transfer chamber robot 212 configured to transfer substrate 202 between process chambers 214, 216, 218, load lock 220, etc.

Process chambers 214, 216, 218 can be adapted to carry out any number of processes on substrates 202. A same or different substrate process can take place in each processing chamber 214, 216, 218. A substrate process can include atomic layer deposition (ALD), physical vapor deposition (PVD), chemical vapor deposition (CVD), etching, annealing, curing, pre-cleaning, metal or metal oxide removal, or the like. Other processes can be carried out on substrates therein.

A load lock 220 can also be coupled to housing 208 and transfer chamber 210. Load lock 220 can be configured to interface with, and be coupled to, transfer chamber 210 on one side and factory interface 206. Factory interface 206 can be any suitable enclosure, such as, e.g., an Equipment Front End Module (EFEM). Factory interface 206 can be configured to receive substrates 202 from substrate carriers 222

(e.g., Front Opening Unified Pods (FOUPs)) docked at various load ports 224 of factory interface 206. A factory interface robot 226 (shown dotted) can be configured to transfer substrates 202 between carriers (also referred to as containers) 222 and load lock 220.

Manufacturing system 200 can also include a system controller 228. System controller 228 can be and/or include a computing device such as a personal computer, a server computer, a programmable logic controller (PLC), a microcontroller, and so on. System controller 228 can include one or more processing devices, which can be general-purpose processing devices such as a microprocessor, central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device can also be one or more special-purpose processing devices such as an application specific integrated circuit (ASIC), a field programmable gate array (FPGA), a digital signal processor (DSP), network processor, or the like. System controller 228 can include a data storage device (e.g., one or more disk drives and/or solid-state drives), a main memory, a static memory, a network interface, and/or other components. System controller 228 can execute instructions to perform any one or more of the methodologies and/or embodiments described herein. In some embodiments, system controller 228 can execute instructions to perform one or more operations at manufacturing system 200 in accordance with a process recipe. The instructions can be stored on a computer readable storage medium, which can include the main memory, static memory, secondary storage and/or processing device (during execution of the instructions).

FIG. 3 is a flow chart of a method 300 for obtaining data for training a machine learning model, according to aspects of the present disclosure. Method 300 is performed by processing logic that can include hardware (circuitry, dedicated logic, etc.), software (such as is run on a general-purpose computer system or a dedicated machine), firmware, or some combination thereof. In one implementation, method 300 can be performed by a computer system, such as computer system architecture 100 of FIG. 1. In other or similar implementations, one or more operations of method 300 can be performed by one or more other machines not depicted in the figures. In some aspects, one or more operations of method 300 can be performed by system controller 228.

For simplicity of explanation, method 300 is depicted and described as a series of acts. However, acts in accordance with this disclosure can occur in various orders and/or concurrently, and with other acts not presented and described herein. Furthermore, not all illustrated acts can be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 310, process logic processes one or more substrates at a process chamber according to a maintenance operation of a maintenance process recipe. As described above, a maintenance process can involve performing one or more maintenance operations, such as seasoning operations, at a process chamber. Such maintenance operations can be performed to remove byproduct on surfaces of process chamber components and/or interior surfaces of the process chamber and etch one or more seasoning substrates (e.g., substrate 202) to bring the process chamber to a condition that is suitable for processing production substrates. In some embodiments, system controller 228 of FIG. 2 can perform one or more maintenance operations at one or more of process chambers 214, 216, 218. For purposes of explanation and illustration only, embodiments of the present disclosure are described with respect to process chamber 214. However, such embodiments can be applied to process chamber 216, process chamber 218, and/or any other process chamber of manufacturing equipment 124, as described herein.

Sensors 126 can collect data indicating a state or condition of an interior environment of process chamber 214 and/or process chamber components of process chamber 214 before, during, and/or after the performance of the maintenance operations at process chamber 214. In some embodiments, the data collected by sensors 126 can be trace sensor data, which indicates a change of the state or condition of the interior environment and/or the process chamber components based on the performance of the maintenance operations. In an illustrative example, one or more sensors 126 can collect data indicating a temperature of a substrate support assembly and/or a lid before, during, and/or after performance of the one or more maintenance operations. The trace sensor data can indicate a change in the temperature of the substrate support assembly and/or the lid based on the performance of the maintenance operations. System controller 228 can receive the sensor data from sensor 126 (e.g., via network 130 and/or via another connection between sensors 126 and controller 228). In some embodiments, system controller 228 can store the received sensor data at data store 140, as described herein.

At block 312, process logic obtains metrology data associated with the one or more substrates after completion of the maintenance operation at the process chamber. In some embodiments, system controller 228 can cause the one or more substrates 202 (e.g., seasoning substrates) to be transferred from process chamber 214 to metrology equipment 128. For example, system controller 228 can transmit a signal to a motion controller for transfer chamber robot 212 to cause transfer chamber robot 212 to remove substrate 202 from process chamber 214 and place substrate 202 at load lock 220. System controller 228 can then transmit another signal to a motion controller for factory interface robot 226 to cause factory interface robot 226 to remove substrate 202 from load lock 220 and place substate 202 at another station at or adjacent to factory interface 206. In some embodiments, substrate 202 can be transferred (e.g., by factory interface robot 226, by another robot, by an operator of manufacturing equipment 224, etc.) to metrology equipment 128. Metrology equipment 128 can generate metrology data associated with substrate 202 by performing one or more metrology measurements for at least one surface of substrate 202. As indicated above, metrology measurements can include critical dimension measurements, etch rate measurements, and so forth. Metrology equipment 128 can provide the metrology measurement values to system controller 228 (e.g., via network 130) in some embodiments. In other or similar implementations, metrology equipment 128 can store the metrology measurement values at data store 140. In yet other or similar embodiments, an operator of manufacturing equipment 124 can provide the metrology measurement values as input to a GUI of client device 120 and client device 120 can provide the input metrology measurement values to system controller 228 (e.g., via network 130).

At block 314, process logic determines that one or more criteria are satisfied based on the obtained metrology data. In some embodiments, system controller 228 can determine whether the one or more criteria are satisfied by determining whether a difference between the obtained metrology data and the target metrology data meets or falls below a threshold different. The target metrology data can include metrology data that is collected for a seasoning substrate that is processed at a process chamber that is at a state that is suitable for production substrate processing. In some embodiments, the target metrology data can be determined based on experimental data and/or other data collected for one or more process chambers of manufacturing equipment 124. For example, system controller 228 (or another system controller for other manufacturing equipment) can perform one or more maintenance processes at process chambers using one or more seasoning substrates. Metrology equipment 128 (or other metrology equipment) can generate metrology data for each of the one or more seasoning substrates and store the generated metrology data at data store 140.

After the maintenance process is performed at the process chambers, the process chambers can process one or more production substrates, as described herein. The production substrates can be analyzed after processing (e.g., metrology data can be generated for the production substrates, etc.) and a computing system (e.g., system controller 228) can determine, based on the analysis, whether the production substrates satisfy target conditions. The target conditions can be specified in specification documentation provided by a customer of manufacturing system 100 and/or by an operator, developer, or engineer of manufacturing system 100. The computing system can determine the process chambers that processed the production substrates that satisfied the target conditions and can identify the metrology data generated for the seasoning substrates processed according to a maintenance process for such process chamber (e.g., from data store 140). Such metrology data can be the target metrology data, as described above. It should be noted that target metrology data can be obtained according to other techniques, in additional or alternative embodiments. The target metrology data can be stored at data store 140 and/or at another memory associated with system 100.

System controller 228 can obtain the target metrology data (e.g., from data store 140) and can determine a difference between the metrology data obtained for the seasoning substrate processed at process chamber 214 and the target metrology data. In response to determining that the difference meets or falls below a threshold difference, system controller 228 can determine that the one or more criteria are satisfied. In some embodiments, system controller 228 can determine that the one or more criteria are not satisfied if the difference exceeds the threshold difference.

At block 316, process logic identifies trace sensor data collected at the process chamber during the performance of the one or more operations at the process chamber. As indicated above, the trace sensor data collected during performance of the maintenance process using substrate 202 can be stored at data store 140. Accordingly, system controller 228 can identify the trace sensor data at data store 140, in some embodiments. Such trace sensor data is referred to herein as a reference data set or a golden data set, in some embodiments. At block 318, process logic provides the identified trace sensor data for training a machine learning model. In some embodiments, process logic can provide the trace sensor data to training set generator 172 and/or training engine 182 of predictive system 110.

As indicated above, training set generator 172 can generate training data sets to train, validate, and/or test a machine learning model 190. In some embodiments, machine learning model 190 can be an artificial neural network, such as a deep auto-encoder. A deep auto-encoder refers to a type of deep learning feed-forward neural network. In some embodiments, training set generator 172 can generate the training data set for training the deep auto-encoder by obtaining the trace sensor data (e.g., from system controller 228), as described above and performing one or more pre-processing operations (e.g., normalization operations, etc.) on the trace sensor data. In some embodiments, a pre-processing operation can include an operation to remove (e.g., drop) data associated with sensors with no significant variation, an operation to normalize the trace sensor data, an operation to interpolate or extrapolate missing values from the trace sensor data, a feature scaling operation, and so forth. Training set generator 172 can perform one or more time-slicing operations on the pre-processed trace sensor data to generate time slices of the trace sensor data. A time-slicing operation can include an operation that organizes or otherwise treats the trace sensor data in view of window segments (e.g., time slides). The time-slicing operation can be an operation to identify a time-based segment of the trace sensor data so to optimize the size of the data segments for processing by the model. Each time slice can represent trace sensor data collected during performance of a respective maintenance operation of the maintenance process performed at process chamber 214. Each generated time slice can be included in the training data set, in some embodiments.

Training set generator 172 can provide the training data set to training engine 182, in some embodiments. Training engine 182 can feed the training data set to model 190 (e.g., the autoencoder). The autoencoder can learn, based on the training data, a minimum set of features to reproduce the reference trace sensor data set. An output of the autoencoder can include an indication of a signature or fingerprint for trace sensor data of each time slice of the training data. The output can have a minimized reconstruction error (e.g., mean squared error or MSE) relative to the input sensor trace data. The trained model 190 can be used to determine a current state of a process chamber during performance of a maintenance process, in accordance with embodiments provided herein.

In an illustrative example, a series of maintenance operations can be performed for approximately 18 substrates. System controller 228 can determine, after a maintenance operation is completed for the substrates of the 18 substrates, that the one or more criteria (e.g., of block 314) are satisfied based on the metrology data generated for the final substrates. Such maintenance operation is referred to as the final maintenance operation of the maintenance process. A maintenance operation that processed the initial substrates of the 18 substrates is referred to as the initial maintenance operation of the maintenance process. System controller 228 can identify the trace sensor data collected at process chamber 214 during each of the maintenance operations of the maintenance process and can provide the identified trace sensor data to training set generator 172, as described above. Training set generator 172 can pre-process the trace sensor data, as described above, and can perform one or more time-slicing operations on the pre-processed data. Each generated time slice can include trace sensor data collected during performance of a respective maintenance operation of the series of maintenance operations. Training engine 182 can provide the training data to train model 190, as described above. An output of the trained model can include a signature value or a fingerprint value for each time slice of the training data. The signature/fingerprint values can indicate a difference between the state or condition of the process chamber during performance of a respective maintenance operation and the state or condition of the process chamber during performance of the final maintenance operation. Such signature/fingerprint values therefore indicate the state of the process chamber 214 during the performance of each respective maintenance operation of the maintenance process.

It should be noted that although embodiments of the present disclosure describe training and using a deep autoencoder to determine the current state of the process chamber, the current state of the process chamber can be determined according to other techniques. For example, system controller 228 (or another computing system of system 100) can use principal component analysis (PCA) techniques to determine the current state of the processing chamber. For example, statistical values (e.g., mean value, standard deviation value, maximum value, minimum value, a range of values, a median value, etc.) can be extracted from the reference trace sensor data obtained in accordance with embodiments of FIG. 3. The system controller 228 can provide the statistical values to a PCA engine (e.g., running on one or more computing systems described with respect to FIG. 1, or another computing system). The PCA engine can evaluate a reconstruction error between features of the trace sensor data. An output of the PCA engine can include a distance measure, which indicates the reconstruction error between the features of the trace sensor data collected during a respective maintenance operation and the features of trace sensor data collected during a final maintenance operation of the maintenance process. Such distance measures can indicate the state of the process chamber 214 during the performance of each respective maintenance operation of the process, as described herein.

Figure 4:
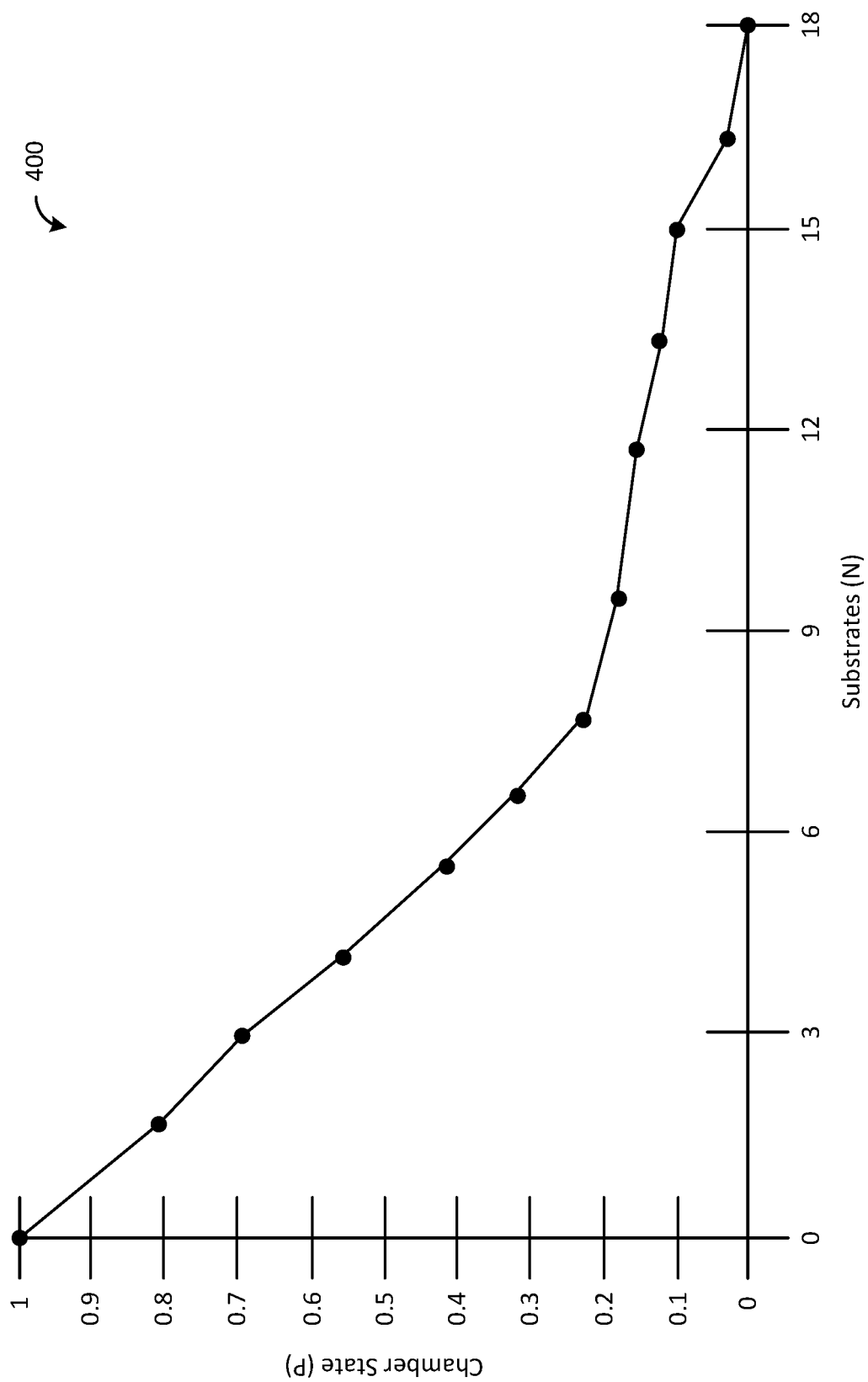
FIG. 4 depicts example chamber state data associated with one or more reference chambers, according to aspects of the present disclosure.

FIG. 4 depicts example chamber state data 400 associated with one or more reference chambers, according to aspects of the present disclosure. As illustrated in FIG. 4, chamber state data 400 indicates a chamber state (P) of a process chamber (e.g., process chamber 214) during or after performance of maintenance operations for one or more substrates (N). Chamber state (P) can be or can correspond to a particular value determined based on an output of model 190 and/or the PCA engine, as described above. In an illustrative example, a value of chamber state (P) can be or correspond to a value for a signature and/or fingerprint determined based on an output of model 190, as described above.

In accordance with the previous illustrative example, 18 substrates can be processed (e.g., in sequence) during a series of maintenance operations. The value of chamber state (P) can indicate a difference between the state of the process chamber 214 during performance of a respective maintenance operation and the state of the process chamber 214 during performance of the final maintenance operation. As illustrated in FIG. 4, the value of chamber state (P) during or after performance of the final maintenance operation (e.g., for the $18^{th}$ substrate) is at or around "0" (e.g., indicating a difference of approximately 0% between the state of the process chamber during performance of the maintenance operation for the $18^{th}$ substrate and the state of the process chamber during the final maintenance operation of the maintenance process). As also illustrated in FIG. 4, the chamber state (P) during or after performance of the initial maintenance operation (e.g., for the $1^{st}$ substrate) is at or around "1" (e.g., indicating a difference of approximately 100% between the state of the process chamber during performance of the maintenance operation for the $1^{st}$ substrate and the state of the process chamber during the final maintenance operation of the maintenance process). The chamber state (P) during or after performance of each intermediate maintenance operation (e.g., each maintenance operation between the initial maintenance operation and the final maintenance operation) is between a value of "1" and a value of "0." For example, the chamber state (P) during or after the performance of the maintenance operation for the $3^{rd}$ substrate is at or around 0.7 (e.g., indicating a difference of approximately 0% between the state of the process chamber during performance of the maintenance operation for the $3^{rd}$ substrate and the state of the process chamber during the final maintenance operation for the maintenance process.

In accordance with embodiments and examples of the present disclosure, chamber state data 400 represents reference or golden chamber data for a maintenance process performed at one or more of process chambers 214, 216, and/or 218 of manufacturing system 200. In some embodiments, chamber state data 400 represents reference or golden chamber data for a maintenance process at process chamber 214. Additional or alternative reference chamber state data can be determined for each of process chambers 216 and/or 218, in some embodiments. In other or similar embodiments, chamber state data 400 can be determined based on trace sensor data collected during the maintenance process at chamber 214 and can be used as reference chamber state data for each of process chambers 214, 216, and/or 218.

Figure 5:
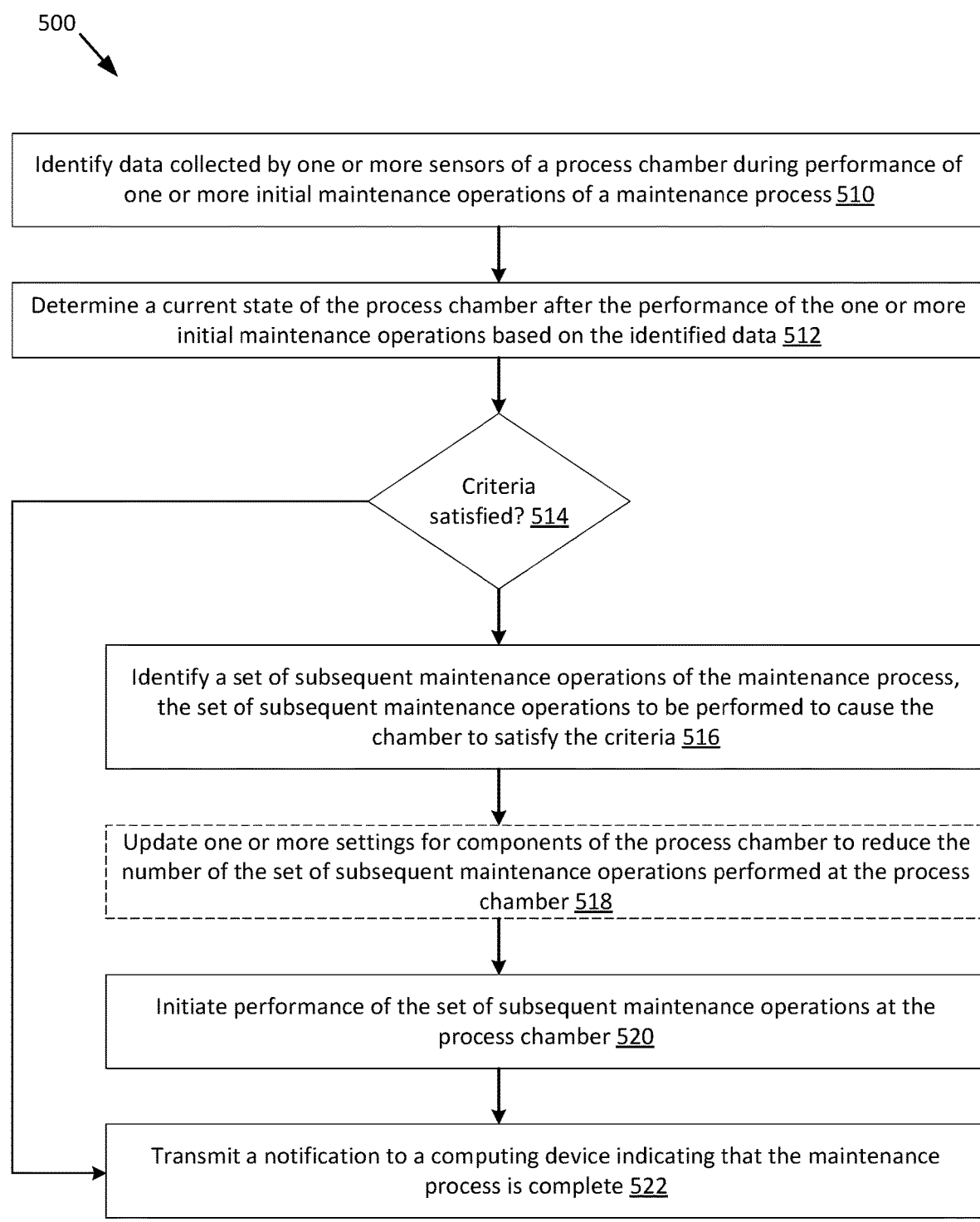
FIG. 5 is a flow chart of a method for process chamber qualification for maintenance process endpoint detection, according to aspects of the present disclosure.

FIG. 5 is a flow chart of a method 500 for process chamber qualification for maintenance process endpoint detection, according to aspects of the present disclosure. Method 500 is performed by processing logic that can include hardware (circuitry, dedicated logic, etc.), software (such as is run on a general-purpose computer system or a dedicated machine), firmware, or some combination thereof. In one implementation, method 500 can be performed by a computer system, such as computer system architecture 100 of FIG. 1. In other or similar implementations, one or more operations of method 500 can be performed by one or more other machines not depicted in the figures. In some aspects, one or more operations of method 500 can be performed by predictive component 114 and/or system controller 228.

For simplicity of explanation, method 500 is depicted and described as a series of acts. However, acts in accordance with this disclosure can occur in various orders and/or concurrently, and with other acts not presented and described herein. Furthermore, not all illustrated acts can be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 510, process logic identifies data collected by one or more sensors of a process chamber during performance of one or more initial maintenance operations of a maintenance process associated with the process chamber. In some embodiments, a maintenance process (e.g., a PM process, a CM process, etc.) can be initiated at one or more of process chambers 214, 216, 218 (e.g., referred to as chamber 214 for purposes of example and explanation only). One or more initial maintenance operations (e.g., seasoning operations) can be performed at the process chamber 214 using one or more seasoning substrates, in accordance with embodiments described herein. During performance of the initial maintenance operation(s), sensors 126 of process chamber 214 can collect data indicating a state or condition of one or more process chamber components and/or an interior environment of process chamber 214, as described above. In some embodiments, the collected data can be trace sensor data. System controller 228 can obtain the trace sensor data collected during performance of the initial maintenance operations and can store the obtained data at data store 140, as described above. Predictive component 114 can identify the data at data store 140 and/or can received the data from system controller 228, in some embodiments.

At block 512, process logic determines a current state of the process chamber after the performance of the one or more initial maintenance operations based on the identified data. In some embodiments, predictive component 114 can feed the trace sensor data as input to model 190 and/or provide the trace sensor data to the PCA engine, described above. Predictive component 114 can perform one or more pre-processing operation and/or time-slicing operations on the trace sensor data prior to feeding the data to model 190 and/or the PCA engine, in some embodiments. In accordance with embodiments described herein, model 190 can be trained to predict a current state of process chamber 214 based on given trace sensor data collected during performance of one or more initial maintenance operations. PCA engine can be configured to determine a current state of process chamber 214 based on statistical values extracted from trace sensor data collected during performance of the one or more initial maintenance operations, as described above.

Predictive component 114 can obtain one or more outputs of model 190 and/or the PCA engine. The one or more outputs can indicate, for each initial maintenance operation performed at process chamber 214, a current state of the process chamber 214. In some embodiments, the current state of the process chamber 214 indicated by the one or more outputs can include one or more values for a chamber state (P), as described with respect to FIG. 4. In an illustrative example, three initial maintenance operations may be performed at process chamber 214. The output(s) obtained by predictive component 114 can include one or more chamber state (P) values that each indicate a difference of a state of process chamber 214 during or after performance of each respective initial maintenance operation.

At block 514, process logic determines whether the current state of the process chamber satisfies one or more chamber maintenance criteria. Predictive component 114 and/or system controller 228 can determine that the current state of process chamber 214 satisfies the chamber maintenance criteria by determining whether a difference between the chamber state (P) values determined for process chamber 214 following performance of the initial maintenance operations and the chamber state (P) values determined for the reference process chamber 214 following performance of final maintenance operations of the maintenance process falls below a threshold value. In some embodiments, predictive component 114 and/or system controller 228 can determine a distance measure between the chamber state (P) value determined for process chamber 214 and the final chamber state (P) value of the reference chamber data set. Predictive component 114 and/or system controller 228 can determine the distance measure by applying a unified distance measure equation to the chamber state (P) values determined for the process chamber 214 and included in the reference chamber data. An example unified distance measure equation is provided below:

$$dp(F, G) := \inf_{U, V} \|U - V\|_p$$

where dp (F, G) represents the distance between two probability distributions (F, G) for chamber state probability distribution for chamber state (P) value determined for process chamber 214 and chamber state (P) value of reference chamber data, and U, V are pairs of random variables with respect to cumulative distributions, F and G.

In an illustrative example, initial maintenance operations can be performed using three seasoning substrates at process chamber 214, as described above. Predictive component 114 can determine that the chamber state value (P) after performance of the initial maintenance operations is approximately "0.7." Chamber reference data 400 can indicate that the target chamber state value (P) after performance of the final maintenance operations for the maintenance process is approximately "0." Predictive component 114 and/or system controller 228 can determine, using the example unified distance measure equation provided above, that the distance between the determined chamber state value (P) and the target state value (P) after performing maintenance operations for three seasoning substrates is approximately "0.7," which meets or exceeds a first threshold distance value. Accordingly, predictive component 114 can determine that the chamber maintenance criteria is not satisfied after performance of the initial maintenance operations.

In response to process logic determining that the current state of the process chamber satisfies the one or more chamber maintenance criteria, method 500 proceeds to block 522, described below. In response to process logic determining that the current state of the process chamber does not satisfy the one or more chamber maintenance criteria, method 500 proceeds to block 516. At block 516, process logic identifies a set of subsequent maintenance operations of the maintenance process, the set of subsequent maintenance operations to be performed to cause the current state of the process chamber to satisfy the one or more chamber maintenance criteria. Predictive component 114 and/or system controller 228 can identify a set of subsequent maintenance operations to be performed at process chamber 214 based on a difference between the total number of seasoning substrates processed according to the maintenance process associated with reference chamber data 400 and the number of seasoning substrates processed according to the initial maintenance operations. In an illustrative example, the maintenance process associated with reference chamber data 400 includes maintenance operations performed for a total of 18 seasoning substrates, whereas three seasoning substrates were processed according to the initial maintenance operations at process chamber 214. Predictive component 114 and/or system controller 228 can determine a difference between the total number of seasoning substrates processed according to the maintenance process of reference chamber data 400 and the number of substrates processed according to the initial maintenance operations (e.g., 15 seasoning substrates). Accordingly, predictive component 114 and/or system controller 228 can determine that 15 additional seasoning substrates are to be processed at process chamber 214 in order for the process chamber to be brought to a state that is suitable for processing production substrates. Predictive component 114 and/or system controller 228 can identify a set of subsequent maintenance operations that are to be performed for the 15 seasoning substrates so to bring the chamber to the suitable state.

At block 518, process logic, optionally, updates one or more settings for components of the process chamber to reduce the number of subsequent maintenance operations performed at the process chamber. Process logic can update the one or more settings in view of a difference between the chamber state value (P) determined after performance of the initial maintenance operations for a particular number of seasoning substrates and the target chamber state value (P) determined after maintenance operations performed for the same number of seasoning substrates, as indicated by chamber reference data 400. In accordance with a prior illustrative example, predictive component 114 can determine that the chamber state value (P) after performance of the initial maintenance operations is approximately "0.7." Chamber reference data 400 can indicate that the target chamber state value (P) after performance of maintenance operations for three seasoning substrates is approximately "0.7." Predictive component 114 and/or system controller 228 can determine that the distance between the determined chamber state value (P) and the target state value (P) after performing maintenance operations for three seasoning substrates is approximately "0," indicating that the state of the chamber after performance of the maintenance operations corresponds to the target state. Predictive component 114 and/or system controller 228 can determine that chamber component settings are not to be updated for the subsequent maintenance operations by determining that the determined distance falls below a second threshold distance value. In another illustrative example, predictive component 114 can determine that the chamber state value (P) after performance of the initial maintenance operations is approximately "0.9." Predictive component 114 and/or system controller 228 can determine that the distance between the determined chamber state value (P) and the target state value (P) (e.g., 0.7). is approximately "0.2," which meets or exceeds the second threshold distance value. Accordingly, predictive component 114 and/or system controller 228 can determine that one or more settings for components of the process chamber are to be updated for the performance of the set of subsequent maintenance operations.

Figure 6:
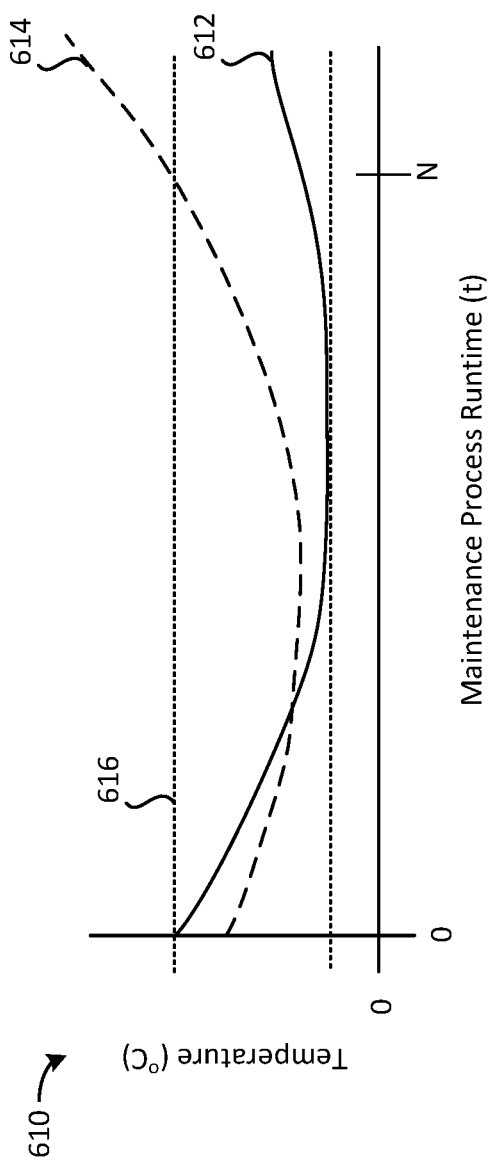
FIG. 6 illustrates example sensor data, according to aspects of the present disclosure.

In some embodiments, predictive component 114 and/or system controller 228 can determine one or more updates to the settings to the process chamber components based on a difference between the trace sensor data collected for the initial maintenance operations and trace sensor data collected for maintenance operations performed at the reference chamber (e.g., that generated reference chamber state data 400). FIG. 6 illustrates example sensor data, according to aspects of the present disclosure. As illustrated in FIG. 6, data 610 indicates a temperature of one or more components (e.g., a lid of a process chamber) during performance of one or more maintenance operations. Curve 612 indicates a temperature of the components (e.g., as monitored by sensors 126) during performance of one or more maintenance operations of the maintenance process at the reference process chamber. Curve 614 indicates a temperature of the components during performance of initial maintenance operations at process chamber 214. Dashed lines 616 of FIG. 6 indicate a range of acceptable component temperature during the process runtime, as defined by curve 612. As illustrated in FIG. 6, curve 614 extends outside of the range indicated by dashed lines 616. Accordingly, data 600 indicates that the temperature of the component at chamber 214 is outside of the acceptable range of component temperatures.

In some embodiments, predictive component 114 and/or system controller 228 can update a setting to reduce the temperature of the component based on the difference between the monitored temperature that is outside of the acceptable range and the target temperature, as indicated by curve 612. In an illustrative example, curve 614 can drift outside of the acceptable range indicated by dashed lines 616 at or around time t(N) during performance of the initial maintenance operations. Predictive component 114 and/or system controller 228 can determine a difference of the temperature of the component at process chamber 214 at time t(N) and the target temperature at time t(N), as indicated by curve 612. Predictive component 114 and/or system controller 228 can update a temperature setting for the component so to reduce the temperature of the component based on the determined difference, in some embodiments.

Referring back to FIG. 5, at block 520, process logic initiates performance of the set of subsequent maintenance operations at the process chamber. In some embodiments, predictive component 114 can transmit to system controller 228 a notification of the set of subsequent maintenance operations to be performed at process chamber 214. The notification can additionally include an indicate of one or more settings that are to be updated at process chamber 214 during performance of the operation, in some embodiments. System controller 228 can initiate the performance of the set of subsequent maintenance operations using one or more additional seasoning substrates, in accordance with previously described embodiments.

At block 522, process logic transmits a notification to a computing device indicating that the maintenance process is complete. Sensors 126 at process chamber 214 can collect data during performance of the set of subsequent maintenance operations, as described herein. Predictive component 114 can feed the trace sensor data collected by sensors 126 to model 190 and/or the PCA engine to determine the current state of the process chamber during performance of the set of subsequent maintenance operations. In response to determining that the one or more chamber maintenance criteria are satisfied based on the determined current state during performance of the subsequent maintenance operations, predictive component 114 and/or system controller 228 can determine that the maintenance process is complete at process chamber 214 (e.g., that process chamber 214 is suitable for processing production substrates) and can transmit the notification to the computing device.

Figure 7:
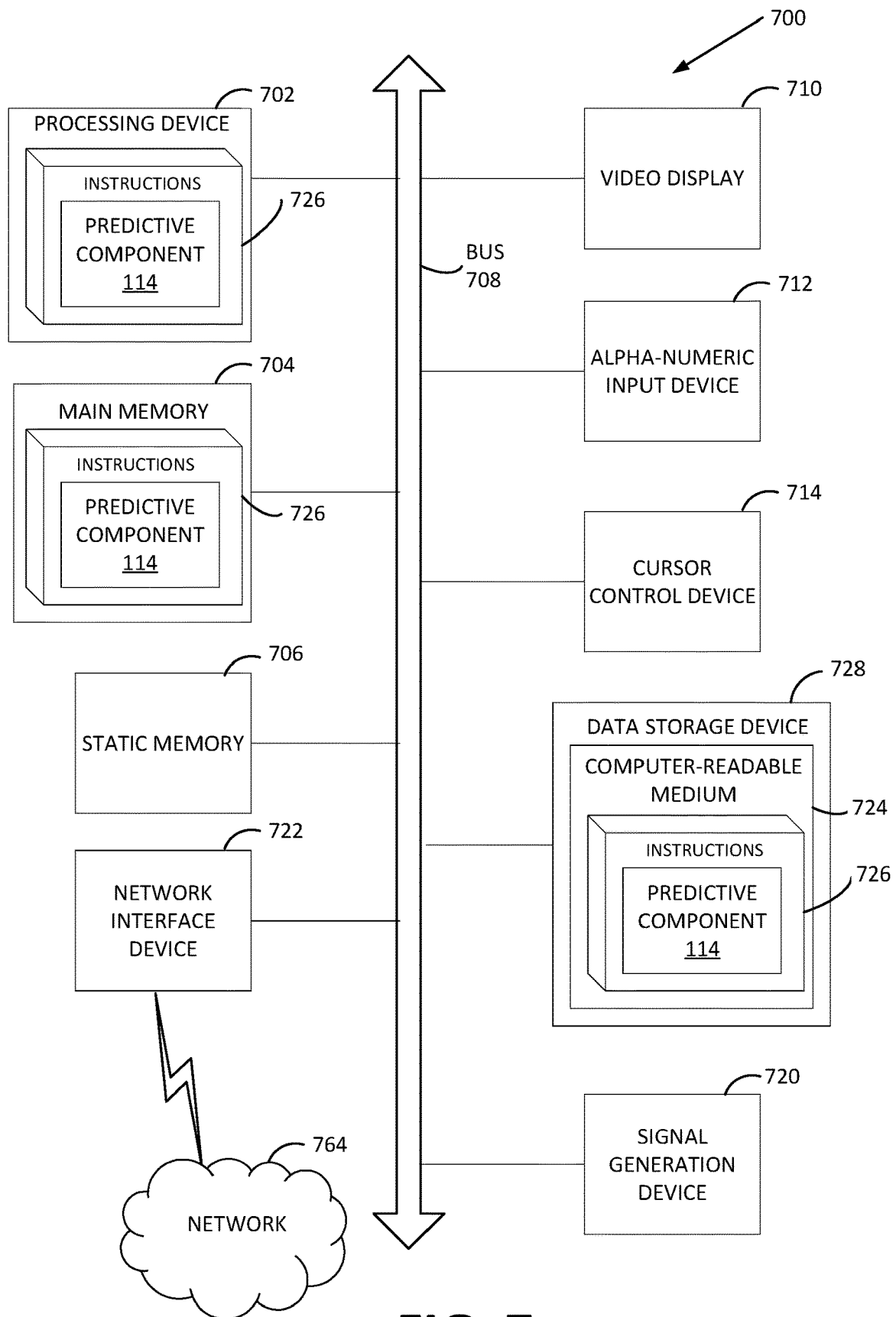
FIG. 7 depicts a block diagram of an illustrative computer system operating in accordance with one or more aspects of the present disclosure.

FIG. 7 depicts a block diagram of an illustrative computer system operating in accordance with one or more aspects of the present disclosure. In alternative embodiments, the machine can be connected (e.g., networked) to other machines in a Local Area Network (LAN), an intranet, an extranet, or the Internet. The machine can operate in the capacity of a server or a client machine in a client-server network environment, or as a peer machine in a peer-to-peer (or distributed) network environment. The machine can be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. In embodiments, computing device 700 can correspond to predictive server 112 of FIG. 1 or another processing device of system 100.

The example computing device 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 728), which communicate with each other via a bus 708.

Processing device 702 can represent one or more general-purpose processors such as a microprocessor, central processing unit, or the like. More particularly, the processing device 702 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. Processing device 702 can also be or include a system on a chip (SoC), programmable logic controller (PLC), or other type of processing device. Processing device 702 is configured to execute the processing logic for performing operations and steps discussed herein.

The computing device 700 can further include a network interface device 722 for communicating with a network 764. The computing device 700 also can include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 728 can include a machine-readable storage medium (or more specifically a non-transitory computer-readable storage medium) 724 on which is stored one or more sets of instructions 726 embodying any one or more of the methodologies or functions described herein. Wherein a non-transitory storage medium refers to a storage medium other than a carrier wave. The instructions 726 can also reside, completely or at least partially, within the main memory 704 and/or within the processing device 702 during execution thereof by the computer device 700, the main memory 704 and the processing device 702 also constituting computer-readable storage media.

The computer-readable storage medium 724 can also be used to store model 190 and data used to train model 190. The computer readable storage medium 724 can also store a software library containing methods that call model 190. While the computer-readable storage medium 724 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure can be practiced without these specific details. In other instances, well-known components or methods are not described in detail or are presented in simple block diagram format in order to avoid unnecessarily obscuring the present disclosure. Thus, the specific details set forth are merely exemplary. Particular implementations can vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of operations of each method can be altered so that certain operations can be performed in an inverse order so that certain operations can be performed, at least in part, concurrently with other operations. In another embodiment, instructions or sub-operations of distinct operations can be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying data collected by one or more sensors of a process chamber of a manufacturing system, wherein the identified data is collected during performance of one or more initial maintenance operations of a maintenance process associated with the process chamber;
   determining, based on the identified data, a current state of the process chamber after the performance of the one or more initial maintenance operations;
   responsive to determining that the current state of the process chamber does not satisfy one or more chamber maintenance criteria, identifying a particular component of the process chamber that contributes to the current state of the process chamber not satisfying the one or more chamber maintenance criteria;
   determining a set of subsequent maintenance operations of the maintenance process comprising one or more process chamber settings that modify process chamber settings of the one or more initial maintenance operations and will counteract the contribution of the particular component; and initiating performance of the set of subsequent maintenance operations at the process chamber.

2. The method of claim 1, wherein determining the current state of the process chamber after the performance of the one or more initial maintenance operations comprises:
providing the identified data as input to a machine learning model, wherein the machine learning model is trained to predict, based on given data, a current state of the process chamber after performance of at least one initial maintenance operation at the process chamber, wherein the current state of the process chamber is determined based on one or more outputs of the machine learning model.

3. The method of claim 2, wherein the machine learning model is a deep learning autoencoder.

4. The method of claim 2, wherein the machine learning model is trained based on a golden data set identified from historical sensor data collected for a historical maintenance process performed at the process chamber or at an additional process chamber.

5. The method of claim 1, wherein determining the current state of the process chamber after the performance of the one or more initial maintenance operations comprises:
providing the identified data as input to a principal component analysis (PCA) engine, wherein the PCA engine is configured to determine a current state of the process chamber based on one or more statistical values extracted from the identified data.

6. The method of claim 1, wherein identifying the particular component of the process chamber that contributes to the current state of the process chamber not satisfying the one or more chamber maintenance criteria comprises:
determining, based on the current state of the process chamber, that at least a portion of the identified data collected by the one or more sensors does not correspond to target data associated with the process chamber or another process chamber of the manufacturing system; and
determining that the at least the portion of the identified data is collected by a sensor associated with the particular component of the process chamber.

7. The method of claim 1, wherein the initial maintenance operations and the set of subsequent maintenance operations comprise a chamber seasoning operation.

8. The method of claim 1, wherein the particular component of the process chamber comprises a lid of the process chamber, and the one or more process chamber settings comprise a temperature setting associated with the lid.

9. A system comprising:
a memory; and
a processing device coupled to the memory, the processing device to:
identify data collected by one or more sensors of a process chamber of a manufacturing system, wherein the identified data is collected during performance of one or more initial maintenance operations of a maintenance process associated with the process chamber;
determine, based on the identified data, a current state of the process chamber after the performance of the one or more initial maintenance operations;
responsive to determining that the current state of the process chamber does not satisfy one or more chamber maintenance criteria, identify a particular component of the process chamber that contributes to the current state of the process chamber not satisfying the one or more chamber maintenance criteria;
determine a set of subsequent maintenance operations of the maintenance process comprising one or more process chamber settings that modify process chamber settings of the one or more initial maintenance operations and will counteract the contribution of the particular component; and
initiate performance of the set of subsequent maintenance operations at the process chamber.

10. The system of claim 9, wherein to determine the current state of the process chamber after the performance of the one or more initial maintenance operations the processing device is to:
provide the identified data as input to a machine learning model, wherein the machine learning model is trained to predict, based on given data, a current state of the process chamber after performance of at least one initial maintenance operation at the process chamber, wherein the current state of the process chamber is determined based on one or more outputs of the machine learning model.

11. The system of claim 10, wherein the machine learning model is a deep learning autoencoder.

12. The system of claim 10, wherein the machine learning model is trained based on a golden data set identified from historical sensor data collected for a historical maintenance process performed at the process chamber or at an additional process chamber.

13. The system of claim 9, wherein to determine the current state of the process chamber after the performance of the one or more initial maintenance operations the processing device is to:
provide the identified data as input to a principal component analysis (PCA) engine, wherein the PCA engine is configured to determine a current state of the process chamber based on one or more statistical values extracted from the identified data.

14. The system of claim 9, wherein to identify the particular component of the process chamber that contributes to the current state of the process chamber not satisfying the one or more chamber maintenance criteria, the processing device is to:
determine, based on the current state of the process chamber, that at least a portion of the identified data collected by the one or more sensors does not correspond to target data associated with the process chamber or another process chamber of the manufacturing system; and
determine that the at least the portion of the identified data is collected by a sensor associated with the particular component of the process chamber.

15. The system of claim 9, wherein the initial maintenance operations and the set of subsequent maintenance operations comprise a chamber seasoning operation.

16. The system of claim 9, wherein the particular component of the process chamber comprises a lid of the process chamber, and the one or more process chamber settings comprise a temperature setting associated with the lid.

17. A non-transitory computer readable medium comprising instructions that, when executed by a processing device, cause the processing device to:
identify data collected by one or more sensors of a process chamber of a manufacturing system, wherein the identified data is collected during performance of one or more initial maintenance operations of a maintenance process associated with the process chamber;

determine, based on the identified data, a current state of the process chamber after the performance of the one or more initial maintenance operations;

responsive to determining that the current state of the process chamber does not satisfy one or more chamber maintenance criteria, identify a particular component of the process chamber that contributes to the current state of the process chamber not satisfying the one or more chamber maintenance criteria;

determine a set of subsequent maintenance operations of the maintenance process comprising one or more process chamber settings that modify process chamber settings of the one or more initial maintenance operations and will counteract the contribution of the particular component; and initiate performance of the set of subsequent maintenance operations at the process chamber.

18. The non-transitory computer readable medium of claim 17, wherein to determine the current state of the process chamber after the performance of the one or more initial maintenance operations the processing device is to:

provide the identified data as input to a machine learning model, wherein the machine learning model is trained to predict, based on given data, a current state of the process chamber after performance of at least one initial maintenance operation at the process chamber, wherein the current state of the process chamber is determined based on one or more outputs of the machine learning model.

19. The non-transitory computer readable medium of claim 18, wherein the machine learning model is a deep learning autoencoder.

20. The non-transitory computer readable medium of claim 18, wherein the machine learning model is trained based on a golden data set identified from historical sensor data collected for a historical maintenance process performed at the process chamber or at an additional process chamber.

* * * * *